(12) United States Patent
Boutros et al.

(10) Patent No.: US 8,401,122 B2
(45) Date of Patent: Mar. 19, 2013

(54) SPHERE DECODING OF SYMBOLS TRANSMITTED IN A TELECOMMUNICATION SYSTEM

(75) Inventors: Joseph Boutros, Paris (FR); Nicolas Gresset, Rennes Cedex (FR); Loic Brunel, Rennes Cedex (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 2080 days.

(21) Appl. No.: 10/848,076

(22) Filed: May 19, 2004

(65) Prior Publication Data

US 2005/0008091 A1    Jan. 13, 2005

(30) Foreign Application Priority Data

Jun. 26, 2003    (EP) .................................... 03291569

(51) Int. Cl.
*H04L 27/06* (2006.01)
(52) U.S. Cl. ........ 375/340; 375/341; 375/348; 375/316; 375/262; 375/261
(58) Field of Classification Search ............... 375/341, 375/348, 316, 262, 261
See application file for complete search history.

(56) References Cited

U.S. PATENT DOCUMENTS

| 7,130,353 | B2 * | 10/2006 | Brunel | 375/261 |
| 2002/0126773 | A1 * | 9/2002 | Brunel | 375/340 |
| 2003/0076890 | A1 * | 4/2003 | Hochwald et al. | 375/264 |
| 2004/0071235 | A1 * | 4/2004 | Love et al. | 375/341 |

OTHER PUBLICATIONS

'Optimum multiuser detection for MC-CDMA systems using spheredecoding', Brunel, L., Personal, Indoor and Mobile Radio Communications, 2001 12th IEEE International Symposium, Sep. 2001, A-16-A-20 vol. 1.*
'Iterative detection of MIMO transmission using a list-sequential (LISS) detector', Baro, S., Hagenauer, J., Witzke, M., Communications, 2003. ICC '03. IEEE International Conference, May 11-15, 2003, p. 2653-2657 vol. 4.*
'A New Reduced-Complexity Sphere Decoder for Multiple Antenna Systems', Chan, A.M., Inkyu Lee, Communications, 2002. ICC 2002. IEEE International Conference, p. 460-464 vol. 1.*
Babak Hassibi, et al. "On the Expected Complexity of Sphere Decoding", 2001 IEEE, pp. 1051-1055.
Haris Vikalo, et al. "Modified Fincke-Pohst Algorithm for Low-Complexity Iterative Decoding Over Multiple Antenna Channels", ISIT 2002, Lausanne, Switzerland, Jun. 30-Jul. 5, 2002, p. 390.
Bertrand M. Hochwald, et al. "Achieving Near-Capacity on a Multiple-Antenna Channel", IEEE Transactions on Communications, vol. 51, No. 3, Mar. 2003, pp. 389-399.

* cited by examiner

*Primary Examiner* — Kenneth Lam
(74) *Attorney, Agent, or Firm* — Oblon, Spivak, McClelland, Maier & Neustadt, L.L.P.

(57) ABSTRACT

A method for decoding at least one signal, including: receiving the at least one signal, the at least one signal being transmitted by at least one transmitting antenna and received by at least one receiving antenna; defining a sphere having a predetermined radius and being centered on a particular symbol chosen among predetermined symbols forming a lattice constellation of symbols which may be received by the receiving antenna; and producing estimated symbols representative of at least one transmitted symbol carried by the at least one signal and identified among the predetermined symbols included in the sphere and likelihood values associated to the estimated symbols.

13 Claims, 5 Drawing Sheets

SPHERE DECODING OF SYMBOLS TRANSMITTED IN A TELECOMMUNICATION SYSTEM

BACKGROUND OF THE INVENTION

1. Field of the Invention

The present invention relates to a method for decoding at least one signal transmitted by means of at least one transmitting antenna and received by means of at least one receiving antenna, which method includes a symbol decoding step for producing estimated symbols representative of at least one transmitted symbol carried by the received signal, and likelihood values associated to said estimated symbols, which estimated symbols are identified among predetermined symbols forming a lattice constellation of symbols which may potentially be received by means of said receiving antenna, said estimated symbols being included in a sphere having a predetermined radius.

2. Description of the Related Art

Such signals are exchanged, for example, in telecommunication systems of a Multiple Input Multiple Output type, further referred to as MIMO systems. A main feature of MIMO systems lies in the fact that a plurality of antennas may be used both at a transmitter end and at a receiver end of a wireless link. MIMO systems have been shown to offer large transmission capacities compared to those offered by single antenna systems. In particular, MIMO capacity increases linearly with the number of transmitting or receiving antennas, whichever the smallest, for a given Signal-to-Noise Ratio (SNR) and under favourable uncorrelated channel conditions. Specific coding schemes have been designed to exploit such an increased available transmission capacity. These schemes, called space-time codes, mainly aim at transmitting signals that are redundant in space and time, which means that a same information shall be transmitted over several antennas and several times, in order to benefit from the spatial diversity offered by the multiple antennas. Several types of space-time codes, designed according to various criteria, can be found in the literature.

Due to the advantages described above, MIMO techniques are likely to be used in future wireless systems intended to provide large spectral efficiencies or, alternatively, reduce the transmitting power required for obtaining a spectral efficiency equivalent to that which is obtained in current telecommunication systems. Such MIMO techniques will very likely be combined with multi-carrier modulation techniques like OFDM (standing for Orthogonal Frequency Duplex Multiplex) and MC-CDMA (standing for MultiCarrier-Code Division Multiple Access), which are also likely to be used in future wireless systems. In specific embodiments of MIMO systems, the information to be transmitted may be encoded with respect to space and time in a manner allowing to use only one antenna at the receiver end.

In the present state of the art, several aspects of space-time encoded MIMO systems are still open issues, such as symbol decoding schemes to be used on the receiver end of a signal transmitted by a transmitter using multiple antennas. Indeed, such a signal must be decoded by the receiver by means of a space-time decoder presenting a complexity which should be as low as possible, in order to spare computing power in a receiving device which is usually power-fed by a battery.

Among various existing decoding schemes, a so-called list sphere decoding technique may be singled out since it provides nearly optimal a posteriori probability decoding. The list sphere decoding scheme essentially consists in identifying, among predetermined symbols forming a lattice constellation of symbols which may potentially be received by means of at least one receiving antenna, estimated symbols which may represent the transmitted symbols. A metric representing the distance between the received symbol and a given estimated symbol of the lattice constellation constitutes the likelihood associated with said estimated symbol. In order to limit the extent of the search for such estimated symbols, only the most likely symbols of the lattice are examined, i.e. those closest to the received symbol, such a limitation being performed by only examining symbols which are included in a sphere having a predetermined radius and centred on the received symbol. Such list sphere decoding schemes have been described in European Patent applications EP 1 215 839 A1 and EP 1 221 773 A1.

A major problem encountered when implementing such a list sphere decoding technique lies in a proper choice of the initial radius of the sphere, which may have to be increased step by step until a suitable number of estimated symbols are identified. In particular situations which often occur in practice, the received symbol may be located outside the lattice constellation, so that the suitable radius of the sphere must have an important value, which will entail a high number of iterations in the course of which the sphere radius will be increased so that the sphere may encompass a suitable number of symbols of the lattice constellation. Such numerous iterations will require considerable computing power on the receiver end. Besides, a high final value for the sphere radius does not guarantee that the resulting sphere will include enough lattice constellation symbols for the symbol decoding step to produce a sufficiently high number of estimated symbols for said symbols to be statistically significant.

SUMMARY OF THE INVENTION

One of the goals of the invention is to enable an efficient decoding of space-time encoded information, which decoding will require less computing power than the known techniques described above.

Indeed, a method according to the opening paragraph is characterized according to the invention in that the sphere used in the course of the symbol decoding step is centered on a particular symbol of the lattice constellation.

The invention ensures, by directly centering the sphere on a symbol belonging to the lattice constellation instead of centering it on a point representing the received symbol, that said sphere will indeed encompass a statistically significant number of lattice constellation symbols.

By virtue of the invention, the sphere radius, once selected, will remain constant during the execution of the symbol decoding step, which enables to save a significant amount of the computing power required to perform symbol decoding steps according to known techniques.

Symbol sequences including each at least two symbols and carried by a signal are often transmitted through one or more so-called invariant channels having physical properties which will remain essentially unchanged for the duration of each sequence, so that a same lattice constellation may be used for defining all symbols which may potentially represent symbols included in a given sequence received by means of the receiving antenna or antennae.

In such circumstances, according to a specific embodiment of the invention, the method described above will advantageously include:

a sphere generation step for defining at least one sphere centered on a reference point of the lattice constellation, and a sphere shifting step for shifting at least one previously generated reference-centered sphere towards said particular symbol.

This specific embodiment enables to model a reference-centered sphere which will be used for decoding all symbols included in a symbol sequence transmitted through essentially invariant channels and thus enables to identify only once all symbols of the lattice included in such a sphere.

The original reference-centered sphere will be used for listing points belonging to an infinite lattice of which the above-described finite lattice constellation constitutes but a subset.

The method described above may additionnally include a metric computing step for computing at least one distance separating said reference point from at least one symbol of the lattice included in the reference-centered sphere.

Metrics representing the distances, with respect to said reference point, of all symbols of said lattice included in the reference-centered sphere will be easily pre-computed, since all symbols involved belong to a well-known lattice. The symbol decoding step carried out for estimating each transmitted symbol may then essentially consist in shifting the pre-defined sphere towards a previously chosen particular symbol of the lattice constellation, e.g. a maximum likelihood symbol identified in relation with each transmitted symbol, and listing the symbols of the finite lattice constellation actually included in the shifted sphere. An additional correction of the pre-computed metrics may also be performed after the sphere shifting step in order to take into account the distance separating the maximum likelihood symbol from the location of the received symbol.

According to a possible embodiment of the invention, the symbol decoding step includes:
a symbol identification and evaluation step, in the course of which identities of all symbols of the lattice constellation included in said sphere are memorized, jointly with related likelihood values associated to said identified symbols,
a list generation step, in the course of which a list including the memorized symbols, ordered according to their likelihood values, is generated, and
a list scanning step, in the course of which said the symbols included in said list are reviewed starting from the symbol having the highest likelihood value until a predefined number of symbols have been reviewed, the reviewed symbols then constituting the estimated symbols produced by the symbol decoding step.

This embodiment enables a straightforward identification of the estimated symbols, provided the radius of the sphere generated for this purpose has a sufficiently high value for said sphere to encompass a statistically significant number of symbols of the lattice constellation. Other embodiments of the invention enable to adjust the sphere radius, as will be explained hereinafter.

According to another embodiment of the invention, at least a first distance between the center of the sphere and at least one given symbol of the lattice included in the sphere is computed, simultaneously with a second distance separating said given symbol from a point representing a received symbol, in the course of a same metric computing step.

This embodiment of the invention will enable to quantify an amount of noise affecting the symbol transmission, provided said given symbol is indeed representative of the transmitted symbol, which amount of noise is represented by the value of the second distance. Such a quantification will usually have to be performed for a large number of identified symbols. A simultaneous computation of the first and second distances for each identified symbol enables to perform such a noise quantification in an efficient manner, since it is easier to do than a later computation for the whole list of identified symbols, which list would then have to be scanned again in its entirety.

According to a specific embodiment of a metric computing step as described above, various dimensions of the lattice constellation are scanned by iteratively selecting one dimension after another, and scanning a subset of dimensions comprised within the selected dimension, new values associated with the first and second distances being computed and stored upon each new dimension selection, which new values are computed by combining previously stored respective values with distances separating, on the one hand, projections of the center of the sphere and of the received symbol, respectively, on a sub-space jointly described by the selected dimension and said subset of dimensions, from, on the other hand, a sub-space described by said subset of dimensions.

As will be explained hereinafter, this specific embodiment of the metric computing step will enable multiple reuse of stored values associated with the first and second distances, which will in turn enable to reduce the computing power required for executing the metric computing step.

In another specific embodiment of the invention, which may be used alternatively or cumulatively with the previous ones, a method as described above will advantageously include:
a sphere set generation step for defining a set of concentric spheres intended to be centered on said particular symbol, and
a sphere radius selection step in the course of which one of said concentric spheres is selected for carrying out the symbol decoding step.

This other advantageous embodiment of the invention enables to model several spheres which may be used for producing estimations of a transmitted symbol. The sphere radius selection may be performed by using a first sphere having the smallest radius for carrying out the symbol decoding step, and comparing the number of symbols included in said sphere to a predetermined value defining a threshold under which the symbols included in the sphere are too scarce to be statistically significant. If the use of the first sphere doesn't enable to reach this threshold, another sphere having the next smallest radius will be tried out, etc. until the threshold defined above is reached. This other embodiment thus allows an automatic adaptation of the sphere radius at a relatively low cost in terms of computing power.

According to yet another embodiment of the invention, the radius of the sphere selected for carrying out the symbol decoding step depends on the location, with respect to at least one edge of the lattice constellation, of said particular symbol.

As will be explained hereinafter, this other embodiment of the invention enables to adapt in a very straightforward manner the radius of the sphere to particular situations in which the number of symbols included in the sphere will foreseeably be limited in one or more directions because of the finite nature of the lattice constellation.

According to yet another embodiment of the invention, the radius of the sphere selected for carrying out the symbol decoding step depends on an elementary volume defined by basic vectors of the lattice constellation.

According to yet another embodiment of the invention, the radius of the sphere selected for carrying out the symbol decoding step derives from a comparison between a parameter representative of a flatness of the lattice constellation and at least one threshold value associated with at least one radius value.

As will be explained hereinafter, this other embodiment of the invention enables to adapt in a very straightforward manner the radius of the sphere to particular situations in which the number of symbols included in the sphere will foreseeably be limited because of a flat shape of the lattice constellation.

According to an advantageous embodiment of the invention, the particular symbol of the lattice constellation on which said sphere is to be centered will previously have been identified as being the most likely representative of the transmitted symbol.

Since the sphere is to be centered on the most likely representative of the transmitted symbol, the lattice constellation symbols thus included in the sphere will have high likelihood values, since being closest to the most likely representative of the transmitted symbol and hence also closest to the received symbol.

The particular symbol on which the sphere is to be centered may previously have been identified by performing an initializing step, for example by means of a so-called minimum mean square error technique, or by means of a sphere decoding technique as described in the above mentioned documents, or according to other known techniques, such as a scheme known to those skilled in the art as the Schnorr-Euchner strategy. Since the main purpose of this initializing step is to provide a single symbol instead of a list of estimated symbols with associated likelihood values, the initializing step may be performed quickly and at a relatively low cost in terms of computing power.

According to one of its hardware-oriented aspects, the invention also relates to a telecommunication system including at least one transmitter and one receiver respectively intended to transmit and receive signals by means of at least one transmitting antenna and at least one receiving antenna, which receiver includes symbol decoding means for producing estimated symbols representative of at least one transmitted symbol carried by a received signal, and likelihood values associated to said estimated symbols, said symbol decoding means being intended to carry out a method as described above.

According to another one of its hardware-oriented aspects, the invention also relates to a communication device provided with at least one receiving antenna for receiving signals, which communication device includes symbol decoding means for producing estimated symbols representative of at least one transmitted symbol carried by a received signal, and likelihood values associated to said estimated symbols, said symbol decoding means being intended to carry out a method as described above.

BRIEF DESCRIPTION OF THE DRAWINGS

The characteristics of the invention mentioned above, as well as others, will emerge more clearly from a reading of the following description given in relation to the accompanying figures, amongst which.

DETAILED DESCRIPTION OF THE INVENTION

Figure 1:
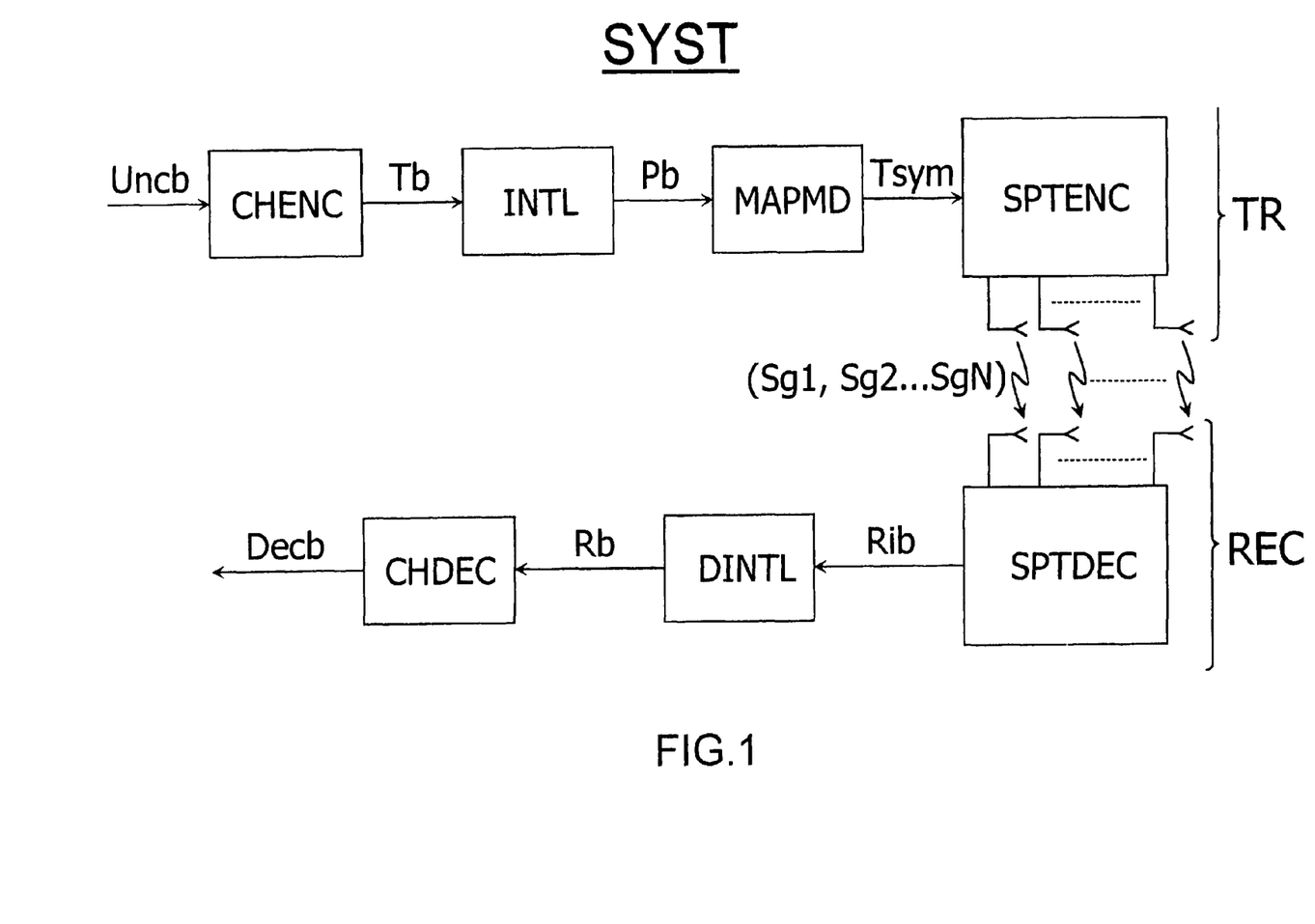
FIG. 1 is a block diagram showing a highly simplified MIMO telecommunication system.

FIG. 1 diagrammatically shows a telecommunication system SYST including at least one transmitter TR and one receiver REC, intended to exchange in this example multiple signals Sg1, Sg2 . . . SgN by means of, respectively, multiple transmitting and receiving antennas.

The transmitter TR shown in the example depicted here includes a channel encoder CHENC intended to apply an encoding, e.g. by means of a convolutional code or of a turbo code, to uncoded data bits Uncb, and to provide a binary stream Tb to be transmitted. The transmitter TR includes an interleaver INTL intended to generate permutated bits Pb, such an interleaving being useful for a later processing on the receiver side, since it will allow to obtain uncorrelated data. The permutated bits Pb are then divided into bit sequences, which bit sequences are then mapped, i.e. transformed into a succession of coded symbols Tsym by a mapping and modulation module MAPMD, each symbol thus corresponding to a single bit sequence.

The successive symbols Tsym are to be fed to a space-time encoder SPTENC, which produces signals obtained by linear combination of real and imaginary components of said coded symbols, which signals will be transmitted, in this example, over a plurality of antennas during several time slots, each time slot corresponding to that of each symbol, hence the name space-time encoder.

The receiver REC shown in the example depicted here is provided with a space-time decoder SPTDEC including symbol decoding means intended to produce estimates of transmitted symbols on the basis of information carried by multiple signals Sg1, Sg2 . . . SgN received from the transmitter TR, which symbol estimates will be used for producing likelihood values Rib related to estimates of the transmitted permutated bits Pb. The likelihood values Rib are then to be de-interleaved by a de-interleaver DINTL which is to output soft likelihood values Rb related to estimates of bits included in the binary stream Tb. A bit decoder included in the receiver REC, further referred to as channel decoder CHDEC, is intended to generate, on the basis of said likelihood values Rb, decoded data bits Decb which should ultimately correspond to the originally uncoded data bits Uncb.

Figure 2:
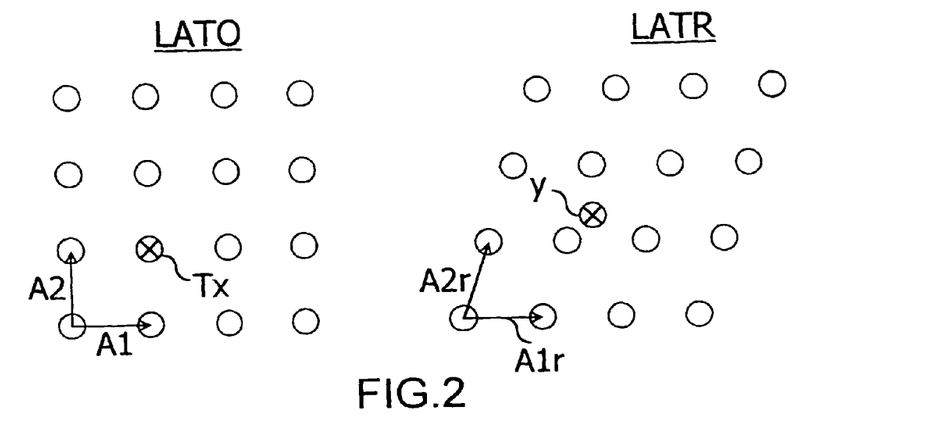
FIG. 2 is a diagram showing an original lattice constellation formed by transmitted symbols at a transmitting end and a transformed lattice constellation formed by symbols which may represent the transmitted symbols at a receiving end.

FIG. 2 shows in two dimensions a first lattice constellation LATO constituted by symbols which may be transmitted by a transmitter as described above, and a second lattice constellation LATR constituted by symbols which may potentially be received by means of a receiver as described above. The first lattice constellation LATO is defined by a first basic vector system (A1, A2), the second lattice constellation LATR being defined by a second basic vector system (A1$r$, A2$r$), which is usually different form the first one because of channel communication conditions affecting signals exchanged between the transmitter and the receiver. Moreover, it appears that though a transmitted symbol Tx is by nature located on a point of the first lattice constellation LAT0, a corresponding received symbol y is usually not located on a point of the second lattice constellation LATR because of noise affecting the communication channels established between the transmitter and the receiver.

Symbol decoding means at the receiver end are intended to provide a list of estimated symbols belonging to the second lattice constellation LATR, which may represent the transmitted symbol y. A metric representing the distance between the received symbol y and a given estimated symbol of the lattice constellation may be computed in order to provide a likelihood value associated with said estimated symbol. In order to limit the extent of the search for such estimated symbols, only the most likely symbols of the second lattice constellation LATR are to be examined in the course of a symbol decoding step, i.e. those symbols who are the closest to the received symbol y.

Figure 3:
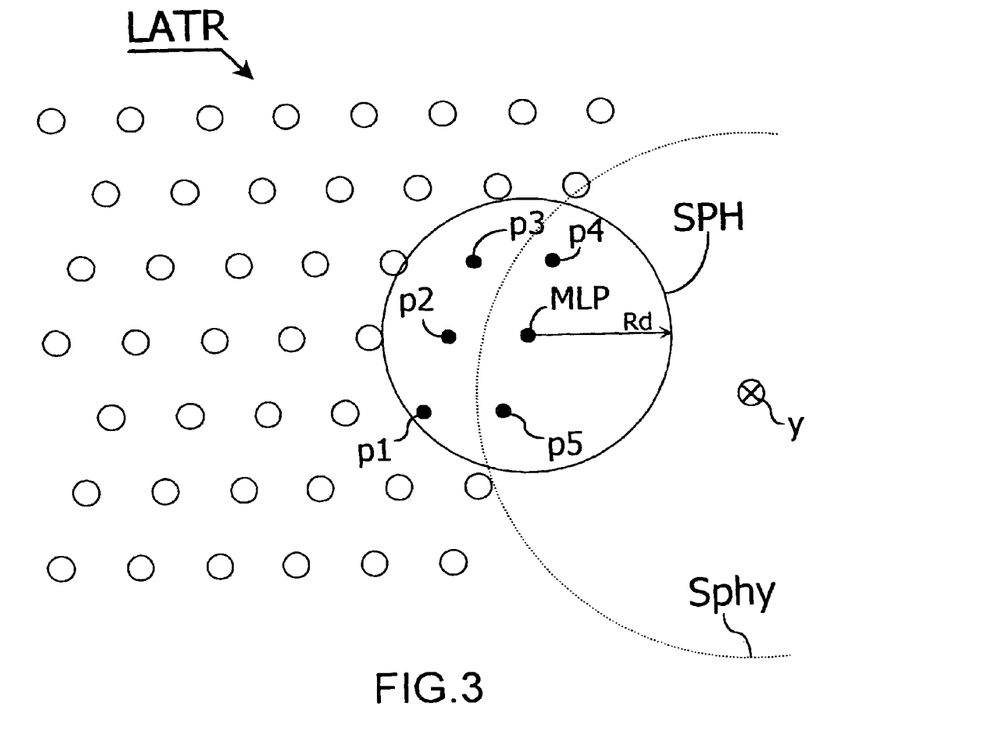
FIG. 3 is a diagram depicting a sphere positioning carried out in a decoding method according to the invention.

FIG. 3 shows how such a limitation of the search for estimated symbols may be performed advantageously thanks to the invention. According to the known art, only those symbols which are included in a sphere Sphy having a predetermined radius and centered on the received symbol y should be examined. As is the case in this example, the received symbol y is often located outside the lattice constellation LATR, so that the radius of the sphere Sphy must have an important value, which will entail a high number of iterations in the course of which the sphere radius will be increased so that the sphere Sphy may encompass a suitable number of symbols of the lattice constellation LATR. Such numerous iterations will require considerable computing power on the receiver end. Besides, an important value for the final sphere radius does not guarantee that the resulting sphere Sphy will include enough lattice constellation symbols for the symbol decoding step to produce a sufficiently high number of estimated symbols for said symbols to be statistically significant. In the example depicted here, the ultimately selected sphere Sphy only encompasses three symbols of the lattice constellation LATR, which is too small a number to produce statistically significant data.

In a method according to the invention, however, the sphere SPH which is to be used the course of the symbol decoding step is centered on a particular symbol MLP of the lattice constellation LATR, which particular symbol MLP will, in this example, previously have been identified as being the most likely representative of the transmitted symbol y.

The invention ensures, by directly centering the sphere SPH on a symbol belonging to the lattice constellation LATR instead of centering it on a point representing the received symbol y, that said sphere will indeed encompass a statistically significant number of lattice constellation symbols, in this example the symbols represented by points p1, p2, p3, p4, p5 and, of course MLP, which are shown in black in the present Figure, though the MLP-centered sphere SPH has a much smaller radius Rd than that of a sphere Sphy centered on said received symbol y. Moreover, since the sphere SPH is to be centered on the symbol MLP which constitutes the most likely representative of the transmitted symbol, the lattice constellation symbols represented by points p1, p2, p3, p4, p5, MLP, included in the sphere SPH have high likelihood values.

Figure 4:
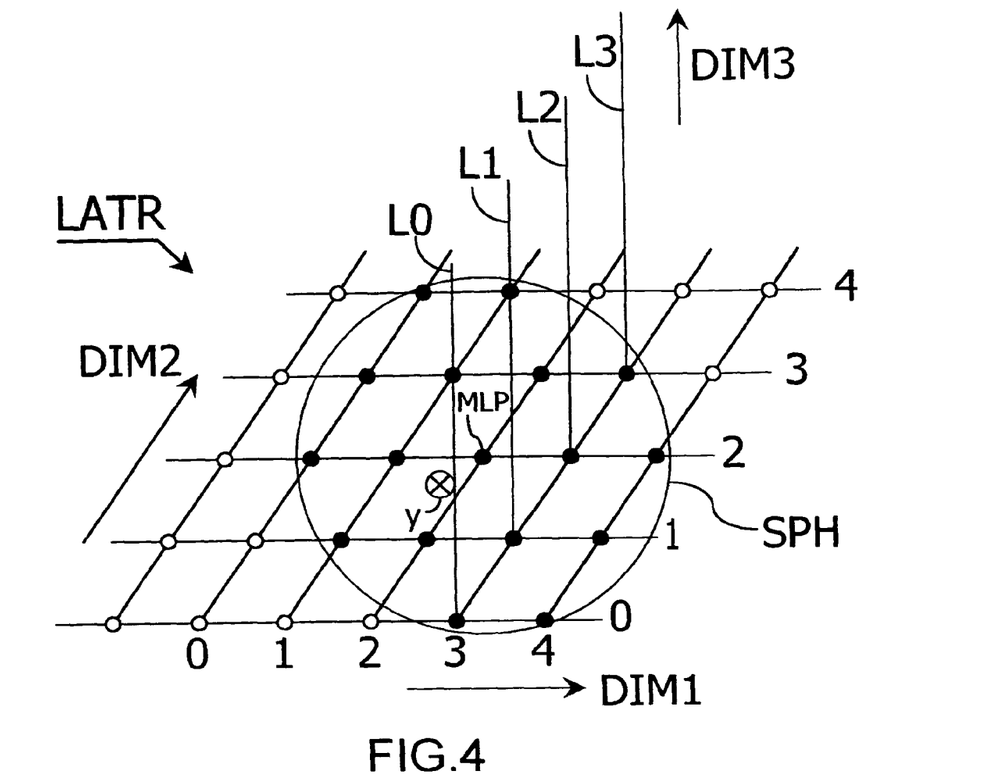
FIGS. 4 and 5 are diagrams depicting how a metric computation step included in such a method may be carried out in an advantageous embodiment of the invention.
Figure 5:
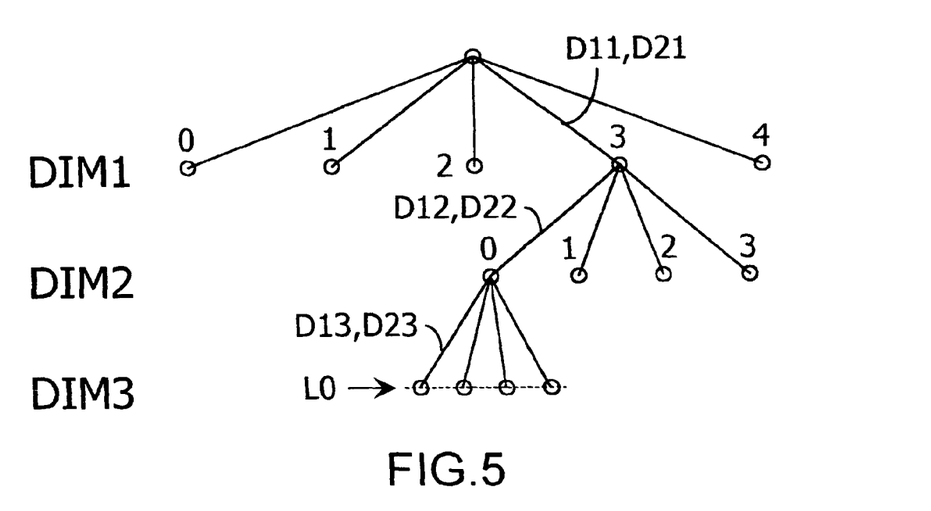

FIGS. 4 and 5 jointly depict a specific embodiment of the invention, according to which at least a first distance (D1, not shown) between the center MLP of the sphere SPH and at least one, in this example each, given symbol of the lattice LATR included in the sphere SPH is computed, simultaneously with a second distance (D2, not shown) separating said given symbol from a point y representing a received symbol, in the course of a same metric computing step.

Such a simultaneous computation of the first and second distances D1 and D2 for each identified symbol enables to perform a noise quantification in an efficient manner, since it is easier to perform this quantification stepwise for each new identified symbol than to perform a later noise quantification for the whole list of ultimately identified symbols, which list would then have to be scanned again in its entirety.

In the embodiment of the metric computing step described here, various dimensions DIM1, DIM2 and DIM3 of the lattice constellation LATR are scanned by iteratively selecting one dimension after another, and scanning a subset of dimensions comprised within the selected dimension.

In this example, the value 3 is selected for the first dimension DIM1, and the corresponding subset of dimensions (DIM2, DIM3) consists in the plane including lines L0, L1, L2, L3, for which plane DIM1=3. The selection of DIM1=3 triggers the computation of a first set of values (D11, D21) of the first and second distances, which first set of values is then stored in order to be reused later.

The scanning of the subset of dimensions (DIM2, DIM3) is then done by selecting all values of DIM2 forming part of coordinates of symbols of the lattice constellation LATR jointly included in the sphere SPH and in the plane for which DIM1=3.

Values 0, 1, 2 and 3 will thus be successively selected for DIM2, and the remaining subset of dimensions DIM3, which includes respective lines L0, L1, L2 and L3, will then be scanned in the purpose of finding symbols included in the sphere SPH.

A first value 0 is thus selected for DIM2, which triggers the computation of a second set of values (D12, D22) of the first and second distances, which second set of values consists in a combination of the values of the first set of values (D11, D21) with distances separating, on the one hand, projections of the center MLP of the sphere SPH and of the received symbol y, respectively, on a sub-space constituted by a plane including lines L0, L1, L2 and L3, from, on the other hand, a sub-space described by line L0.

Such a combination may for example be executed according to the Pythagore theorem. This second set of values (D12, D22) is then stored in order to be reused, with the advantages described hereinafter.

The line L0 is thus scanned, and each time a new symbol belonging to the lattice constellation LATR and included in the sphere SPH is found on said line L0, a third set of values (D13, D23) of the first and second distances is computed according to the method described above. The total first and second distances D1 and D2 between this new symbol and the center MLP of the sphere SPH, respectively the point y representing a received symbol, will be given in this example by this third and final set of values (D13, D23).

Since the second set (D12, D22) of values associated with the first and second distances D1 and D2 are common to all points located on a same line Lm (for m=0 to 3 in this example), it appears that a previous computation and storage of said second set (D12, D22) enables its multiple reuse, which in turn enables to reduce the computing power required for executing the metric computing step.

Figure 6:
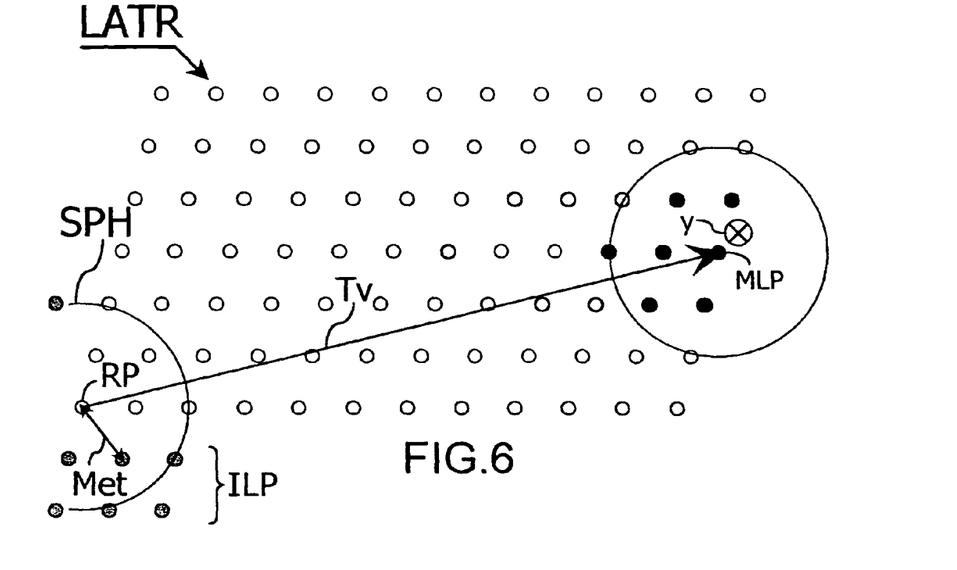
FIG. 6 is a diagram depicting an optional sphere shifting step carried out in a decoding method according to a specific embodiment of the invention.

FIG. 6 depicts a specific embodiment of the invention, according to which a sphere SPH is created in the course of a sphere generation step, which sphere SPH is originally centered on a reference point RP of the lattice constellation LATR, in order to be subsequently shifted according to a translation vector Tv towards the symbol MLP of the lattice constellation LATR, which symbol MLP represents the most likely representative of the transmitted symbol y.

This specific embodiment enables to model a reference-centered sphere SPH which will be used for decoding successive symbols y included in a same symbol sequence transmitted through essentially invariant channels. This embodiment hence enables to identify only once all points of an infinite lattice, from which infinite lattice the lattice constellation LATR is but a subset, which are included in such a reference-centered sphere SPH. Lattice points ILP belonging to such an infinite lattice, yet not included in the finite lattice constellation LATR are shown in grey in this Figure. Metrics Met representing the distances separating said reference point RP from all lattice points included in this reference-centered sphere SPH will be easily pre-computed, since all points involved belong to a lattice whose structure is well-known.

The symbol decoding step will then essentially consist in shifting the pre-defined sphere SPH to a particular lattice constellation symbol, e.g. the maximum likelihood symbol MLP, and listing the symbols of the finite lattice constellation LATR included in the shifted sphere, which symbols are shown in black in the present Figure. An additional correction of the pre-computed metrics may also be performed after the above described sphere shifting step in order to take into account the distance separating the selected center of the sphere, e.g. the maximum likelihood symbol MLP, from the location of the received symbol y.

The specific embodiment described above will be especially useful for decoding successive symbols included in a symbol sequence transmitted through essentially invariant channels, in which case the finite lattice constellation LATR will remain essentially the same for the whole length of the symbol sequence during which only the received symbol y will change, and thus also the associated particular symbol constituting the relevant center of the sphere SPH, in this example the maximum likelihood symbol MLP.

Figure 7:
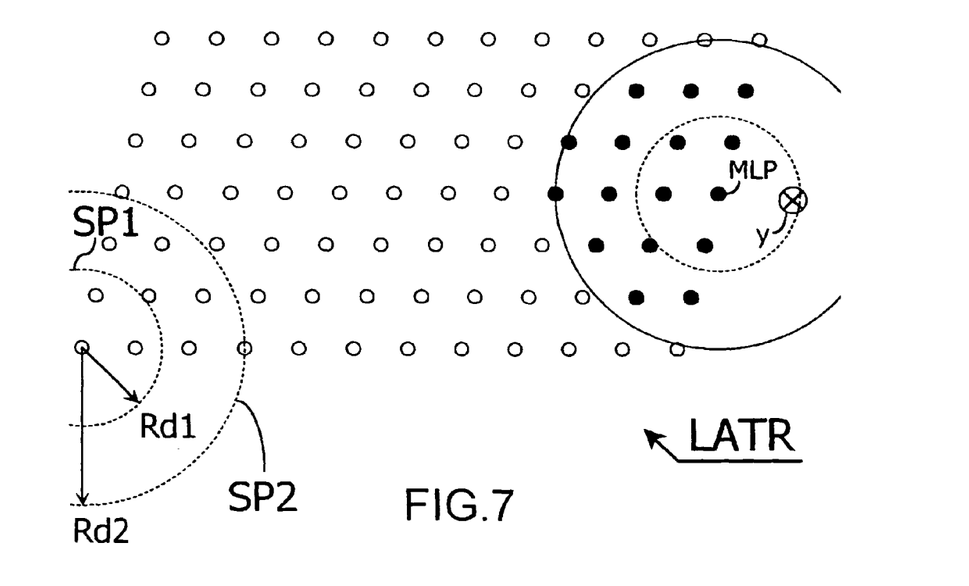
FIG. 7 is a diagram depicting a sphere radius selecting step carried out in a decoding method according to another specific embodiment of the invention.

FIG. 7 depicts another embodiment of the invention, which is used here cumulatively with the previous one, and according to which other embodiment a set of concentric spheres SP1, SP2 intended to be centered on the maximum likelihood symbol MLP is created before a sphere radius selection step is carried out, sphere radius selection step in the course of which one of said concentric spheres SP1, SP2 is selected for carrying out the symbol decoding step.

This other advantageous embodiment of the invention enables to model several spheres SP1, SP2 and others not depicted here, which may be used for producing estimations of a transmitted symbol. The sphere radius selection may be performed by using a first sphere SP1 having the smallest radius Rd1 for carrying out the symbol decoding step, and comparing the number of symbols included in said sphere SP1 after said sphere has been shifted, which number is in this example equal to 5, to a predetermined value, for example 10, defining a threshold under which the symbols included in the sphere are too scarce to be statistically significant. If, as is the case in this example, the use of the first sphere SP1 doesn't enable to reach this threshold, another sphere SP2 having the next smallest radius Rd2 will be tried out, etc. until the threshold defined above is reached. This other embodiment thus allows an automatic adaptation of the sphere radius at a relatively low cost in terms of computing power.

As can be observed in this example, the location of the particular symbol constituting the relevant center of the sphere SPH, in this example the maximum likelihood symbol MLP, may impact the number of symbols included in the sphere selected for executing the symbol decoding, since the lattice constellation LATR is finite. This means that, the closer to an edge of the lattice constellation LATR said maximum likelihood symbol MLP is located, the lower the number of symbols included in said sphere will be. Indeed, it may be observed in the example depicted here that only one half of the selected sphere will include symbols of the lattice constellation LATR, since the sphere is centered on a maximum likelihood symbol MLP located on the very right-hand edge of said lattice constellation LATR.

An advantageous embodiment of the invention may thus involve the provision of a set of N concentric spheres SPi (with i=1 to N) having respective radiuses Rdi, which may be linked by a given progression law, e.g. $Rdi=i.Rd1$ or $Rdi=Rd1^i$ (with Rd1>1), said radiuses featuring increasing values as the maximum likelihood symbol MLP approaches an edge of the finite lattice constellation LATR.

Figure 8:
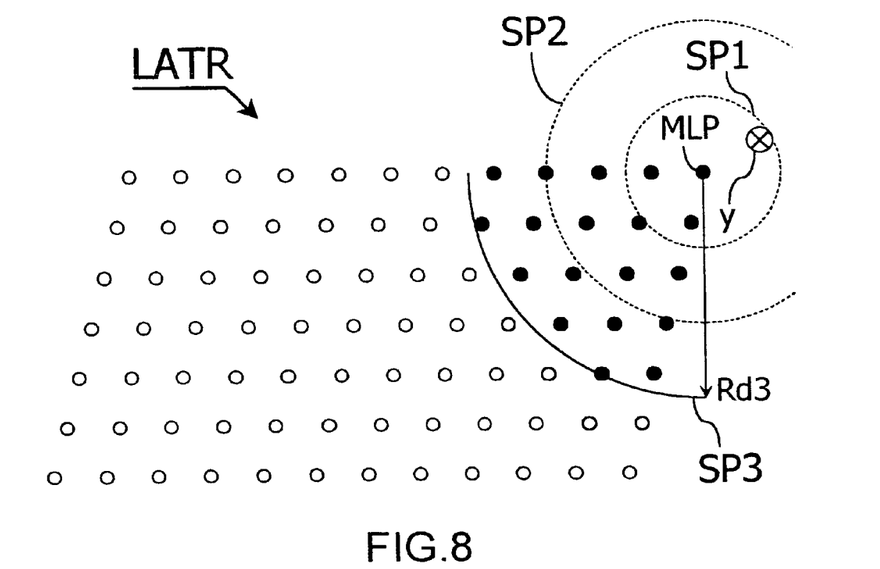
FIG. 8 is a diagram showing another sphere radius selecting step carried out in a decoding method according to yet another specific embodiment of the invention.

FIG. 8 depicts another such situation, in which the maximum likelihood symbol MPL is simultaneously located on two edges of the finite lattice constellation LATR, which triggers the choice of a sphere SPH3 having an even larger radius Rd3 than that of the sphere SP2 described above, since only one lower left-hand quarter of the selected sphere SP3 will include symbols of the lattice constellation LATR.

Such embodiments of the invention thus enable to adapt in a very straightforward manner the radius of the sphere to particular situations in which the number of symbols included in said sphere will foreseeably be limited in one or more directions because of the finite nature of the lattice constellation LATR.

Figure 9:
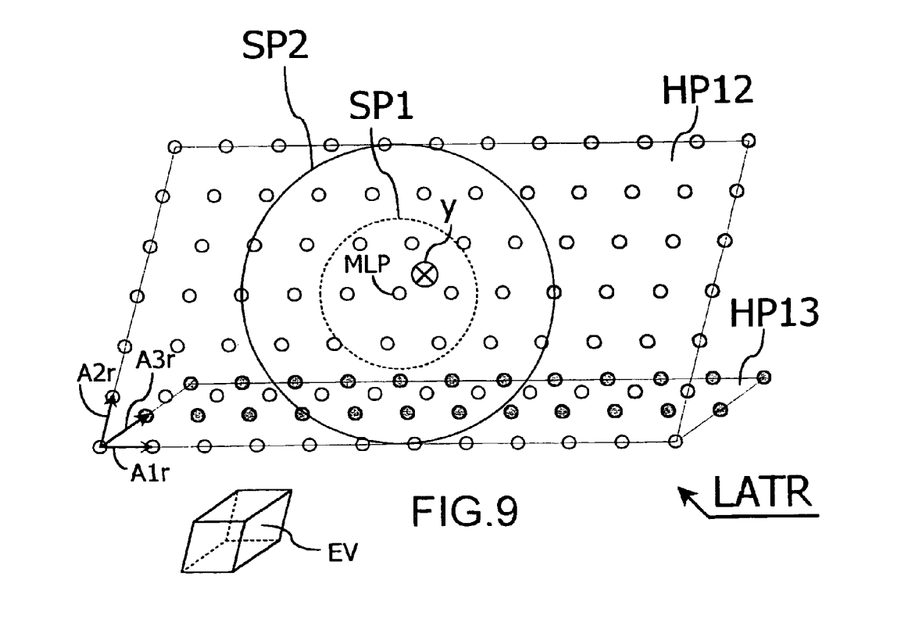
FIG. 9 is a diagram showing another sphere radius selecting step carried out in a decoding method according to yet another specific embodiment of the invention.

FIG. 9 depicts yet another situation, according to which the lattice constellation LATR is three-dimensional and includes a set of parallel hyperplanes HP12 and another set of parallel hyperplanes HP13, respectively defined by vector systems (A1r, A2r) and (A1r, A3r), only one hyperplane of each set being depicted here in order to minimize confusion which such a 2D rendition of a 3D object might induce.

The radius of the sphere selected for carrying out the symbol decoding may depend on an elementary volume, in this example a parallellotope EV defined by basic vectors A1r, A2r, A3r of the lattice constellation LATR. Indeed, for any constant radius of said sphere, the greater the value of said elementary volume EV is, the lower the number of symbols included in said sphere will be. A ratio between the volume of said sphere and said elementary volume EV will give a number of symbols included within said sphere, which number must exceed a predetermined threshold value in order to be statistically significant.

The inventors have found that, in addition to the location, with respect to the edges of the lattice constellation, of the particular symbol on which the sphere is centered according to the invention, another factor which may be taken in consideration is related to the shape of the lattice constellation.

According to yet another embodiment of the invention, the radius of the sphere selected for carrying out the symbol decoding step derives from a comparison between a parameter representative of a flatness of the lattice constellation LATR and at least one threshold value associated with at least one radius value.

Generally speaking, the flatter said lattice constellation LATR is, the greater the radius of the sphere has to be for said sphere to include a statistically significant number of symbols.

The flatness of a finite lattice constellation LATR may be evaluated by comparing the elementary volume EV described above to a given distance between two symbols. Such a given distance may consist in a minimum distance between two symbols, or in the length of the smallest basic vector Akr (for k=1, 2 ... D, with D=3 in the example depicted here) of the lattice LATR. A ratio between said given distance and the elementary volume EV, for example $Akr/(EV)^{1/D}$, may then be compared to a series of thresholds Tj corresponding to increasing radius values Rdj, a sphere of radius Rdj being chosen when $Tj<Akr/(EV)^{1/D}<Tj+1$.

According to a variant of this other embodiment of the invention, the flatness of a finite lattice constellation LATR may be evaluated by computing a mean value S of squared norms of all vectors defining each one of the symbols of the lattice constellation LATR with respect to a given origin point, and by dividing said sum by the elementary volume EV. Such a ratio, for example $S/(EV)^{2/D}$ may then be compared to a series of thresholds Tj corresponding to increasing radius values Rdj, a sphere of radius Rdj being chosen when $Tj<S/(EV)^{2/D}<Tj+1$.

Both above-described variants of this embodiment of the invention enable to adapt in a very straightforward manner the radius of the sphere SPj to particular situations in which the number of symbols included in the sphere will foreseeably be limited because of a flat shape of the lattice constellation LATR.

The invention also allows to dispense with sphere radius adaptation in other embodiments not described hereinbefore. Indeed, if a large initial sphere radius is chosen, all symbols included in the resulting sphere can be listed and stored in memory with their associated likelihood values. Such a list may then be ordered by likelihood rank, from the highest to the smallest, and then scanned in this order until a sufficiently large number of symbols will have been found for said number to be statistically significant, which may be established by a comparison between a predetermined threshold value and the number of already scanned symbols belonging to the lattice constellation.

The invention claimed is:

1. A method for decoding at least one signal, comprising:
   receiving the at least one signal, the at least one signal being transmitted by at least one transmitting antenna and received by at least one receiving antenna, the at least one signal carrying at least one received symbol;
   defining a sphere having a predetermined radius and being centered on a particular symbol chosen among predetermined symbols forming a lattice constellation of symbols, said particular symbol not representing the at least one received symbol; and
   producing estimated symbols representative of at least one transmitted symbol transmitted by the at least one transmitting antenna and identified among the predetermined symbols included in the sphere and likelihood values associated to said estimated symbols.

2. The method according to claim 1, wherein said defining step comprises:
   defining a reference-centered sphere to be centered on a reference point of the lattice constellation; and
   shifting the reference-centered sphere towards said particular symbol.

3. The method according to claim 2, further comprising:
   computing at least one distance separating said reference point from at least one symbol of the lattice included in the reference-centered sphere.

4. The method according to any one of claims 1 to 3, wherein said producing comprises:
   storing identities of all symbols of the lattice constellation included in said sphere jointly with related likelihood values associated to said identified estimated symbols;
   generating a list including the stored identities of all symbols, ordered according to their likelihood values; and
   scanning said symbols included in said list, starting from a symbol having a highest likelihood value, until a predefined number of symbols have been scanned,
   wherein the scanned symbols constitute the produced estimated symbols.

5. The method according to claim 1, further comprising:
   calculating a first distance between the center of the sphere and at least one given symbol of the lattice constellation included in the sphere simultaneously with a second distance separating said given symbol from a point representing a received symbol.

6. The method according to claim 5, further comprising:
   scanning various dimensions of the lattice constellation by iteratively selecting one dimension after another; and
   scanning a subset of dimensions comprised within the selected dimension,
   wherein new values associated with the first and second distances are computed and stored upon each new dimension selection, and
   said new values are computed by combining previously stored respective values with distances separating projections of the center of the sphere and of the received symbol, respectively, on a sub-space jointly described by the selected dimension and said subset of dimensions, from a sub-space described by said subset of dimensions.

7. The method according to claim 1, wherein said defining comprises:
   defining a set of concentric spheres centered on said particular symbol; and
   selecting one of said concentric spheres.

8. The method according to claim 7, wherein a radius of the one of said concentric spheres selected depends on a location, with respect to at least one edge of the lattice constellation, of said particular symbol on which said one of said concentric spheres is to be centered.

9. The method according to claim 7, wherein a radius of the one of said concentric spheres selected depends on an elementary volume defined by basic vectors of the lattice constellation.

10. The method according to claim 7, wherein a radius of the one of said concentric spheres selected is based on a comparison between a parameter representative of a flatness of the lattice constellation and at least one threshold value associated with at least one radius value.

11. The method according to claim 1, wherein the particular symbol of the lattice constellation, out of the predetermined symbols forming the lattice constellation, is most likely representative of the at least one symbol transmitted by the at least one transmitting antenna.

12. A telecommunication system comprising:
   at least one transmitter configured to transmit a signal including at least one transmitted symbol; and
   at least one receiver configured to receive said signal including at least one received symbol,
   wherein the receiver includes
   a symbol decoding unit configured to
   define a sphere having a predetermined radius and being centered on a particular symbol chosen among predetermined symbols forming a lattice constellation of symbols, said particular symbol not representing the at least one received symbol, and
   produce estimated symbols representative of at least one transmitted symbol transmitted by the at least one transmitter and identified among the predetermined symbols included in the sphere and likelihood values associated to said estimated symbols.

13. A communication device, comprising:

at least one receiving antenna configured to receive a signal, the signal including a received symbol;

a symbol decoding unit configured to define a sphere having a predetermined radius and being centered on a particular symbol chosen among predetermined symbols forming a lattice constellation of symbols, said particular symbol not representing the received symbol, and produce estimated symbols representative of at least one transmitted symbol transmitted by at least one transmitting antenna and identified among the predetermined symbols included in the sphere and likelihood values associated to said estimated symbols.

* * * * *